US008075980B2

(12) United States Patent
Eldering et al.

(10) Patent No.: US 8,075,980 B2
(45) Date of Patent: Dec. 13, 2011

(54) DIFFRACTION GRATING ASSISTED SELF-CLEANING MATERIAL

(75) Inventors: Charles A. Eldering, Furlong, PA (US); Edward A. Ehrlacher, Philadelphia, PA (US)

(73) Assignee: Empire Technology Development LLC, Wilmington, DE (US)

( * ) Notice: Subject to any disclaimer, the term of this patent is extended or adjusted under 35 U.S.C. 154(b) by 226 days.

(21) Appl. No.: 12/465,711

(22) Filed: May 14, 2009

(65) Prior Publication Data

US 2010/0291350 A1 Nov. 18, 2010

(51) Int. Cl.
  *B32B 3/00* (2006.01)
  *B32B 3/30* (2006.01)
  *F21V 7/04* (2006.01)
  *G02B 5/18* (2006.01)
  *G02B 27/44* (2006.01)

(52) U.S. Cl. ........ 428/172; 428/156; 428/167; 362/621; 362/622; 359/558; 359/566; 359/569; 359/571

(58) Field of Classification Search .................. 428/156, 428/167, 172; 362/617–622; 359/558, 566, 359/569, 571
See application file for complete search history.

(56) References Cited

U.S. PATENT DOCUMENTS

| 6,324,329 | B1 | 11/2001 | Mizuno |
| 6,913,811 | B2 | 7/2005 | Itoh et al. |
| 7,426,322 | B2 | 9/2008 | Hyde |
| 7,521,394 | B2 | 4/2009 | Xie et al. |
| 2003/0024180 | A1* | 2/2003 | Hartig et al. ................. 52/204.5 |
| 2007/0184975 | A1 | 8/2007 | Yi et al. |

FOREIGN PATENT DOCUMENTS

| EP | 1726567 | 11/2006 |
| JP | 2000-035486 | 2/2000 |
| JP | 2001-018323 | 1/2001 |

OTHER PUBLICATIONS

R. Benedix, F. Dehn, J. Quaas & M. Orgass, "Application of Titanium Dioxide Photocatalysis to Create Self-Cleaning Building Materials," LACER No. 5, (2000), pp. 157-168.
P. Forbes, "Self-Cleaning Materials: Lotus Leaf-Inspired Nanotechnology," Scientific American, Aug. 2008. Last accessed at <http://www.scientificamerican.com/article.cfm?id=self-cleaning-materials> on Nov. 19, 2008.
"TOTO's Work with Environmentally Friendly Photocatalyst Technology," TOTO Today Newsletter, No. 36, Dec. 2003.
A. Shin'ichi, "The Light Clean Revolution," Look Japan Sci-Tech Feature, Jul. 2002. Last accessed at <http://www.lookjapan.com/LBst/02JulyST.htm> on Feb. 23, 2004.

(Continued)

*Primary Examiner* — David Sample
*Assistant Examiner* — Nancy Rosenberg
(74) *Attorney, Agent, or Firm* — Carlineo, Spicer & Kee, LLC

(57) ABSTRACT

A self-cleaning material is generally described that may include a substrate having a first surface and a second surface. A self cleaning layer may be disposed on the first surface of the substrate. A diffraction grating may be formed in an exposed surface of the self cleaning layer, where absorption of light by the self cleaning layer incident on the exposed surface may be enhanced by the diffraction grating in accordance with a blaze condition corresponding to the diffraction grating.

18 Claims, 8 Drawing Sheets

OTHER PUBLICATIONS

R.H. Morf, ",," PSI Scientific Report 2004 / vol. III, NUM—Condensed Matter Research with Neutrons and Muons. Last Accessed at <http://num.web.psi.ch/reports/2004/CMT/cmt-2004-07.pdf> on Jun. 10, 2009.

Su, et al., "Formation, microstructures and crystallization of anodic titanium oxide tubular array," Journal of Materials Chemistry, 2009 (19), pp. 2301-2309, Published on-line Mar. 16, 2009.

Kontos, et al., "Photo-induced effects on self-organized TiO2 nanotube arrays; the influence of surface morphology," Nanotechnology, vol. 20 (2009) 045603, pp. 1-9 (first published Dec. 19, 2008).

"Successful Synthesis of Tungsten Oxide Nanotubes by a Simple Method—Expected to be used as a visible-light-driven photocatalyst for indoor application," AIST National Institute of Advanced Industrial Science and Technology, English translation of press release of Aug. 4, 2008 (online) (Retrieved on Jul. 14, 2010). Retrieved from the Internet <URL: http://www.aist.go.jp/aist_e/latest_research/2008/20080911/20080911.html>.

International Search Report by Graeme Broxam for PCT/US2010/034688, mailed Aug. 3, 2010. 11 pages.

International Search Report by Graeme Broxam for PCT/US2010/034677, mailed Aug. 3, 2010. 8 pages.

\* cited by examiner

DIFFRACTION GRATING ASSISTED SELF-CLEANING MATERIAL

CROSS REFERENCE TO RELATED APPLICATION

This application is related to co-pending U.S. patent application Ser. No. 12/465,717, filed May 14, 2009, entitled Self-cleaning Material.

BACKGROUND

The present disclosure relates to self-cleaning materials, and more specifically to materials utilizing self-cleaning layers with blazed diffraction gratings.

Self-cleaning materials are effective at keeping products and surfaces clean for long periods of time. Self-cleaning materials are being increasingly utilized for a number of applications including building exteriors, bathrooms, windows, and coatings for various surfaces.

BRIEF DESCRIPTION OF THE DRAWINGS

The following detailed description will be better understood when read in conjunction with the following description and appended claims, taken in conjunction with the accompanying drawings, in which there is shown one or more of the multiple embodiments of the present disclosure. It should be understood, however, that the various embodiments of the present disclosure are not limited to the precise arrangements and instrumentalities shown in the drawings.

In the Drawings.

DETAILED DESCRIPTION

Figure 1:
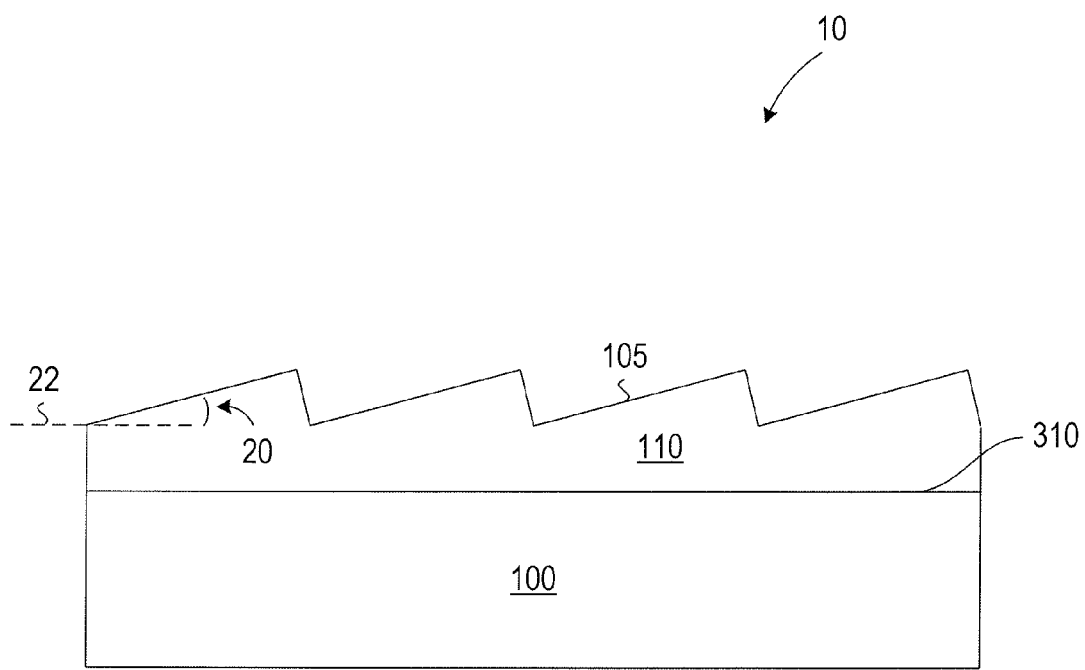
FIG. 1 is a cross-sectional view illustrating an example self-cleaning material.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Briefly stated, the multiple embodiments of the present disclosure include a self-cleaning material including a substrate having a first surface and a second surface. A self cleaning layer may be disposed on the first surface of the substrate. A diffraction grating may be formed in an exposed surface of the self cleaning layer, where absorption of light by the self cleaning layer incident on the exposed surface may be enhanced by the diffraction grating in accordance with a blaze condition corresponding to the diffraction grating.

A self-cleaning material is disclosed that utilizes a diffraction grating that may enhance photo-induced self-cleaning properties of the self-cleaning material. FIG. 1 is a cross-sectional view illustrating an example self-cleaning material 10 arranged in accordance with at least some embodiments of the present disclosure. The example self-cleaning material 10 includes a substrate 100 and a self-cleaning layer 110 with a diffraction grating 105 located on a surface 310 of the substrate 100. The diffraction grating 105 may be formed in the self-cleaning layer 110 using a variety of techniques including, but not limited to mechanical ruling and holographic recording. Detailed discussion regarding the formation of diffraction gratings is omitted here for convenience only and should not be considered as limiting.

The self-cleaning layer 110 may be formed from a material exhibiting some type of self-cleaning properties when exposed to an appropriate wavelength of light. That is, the self-cleaning layer 110 may exhibit, for example, photocatalytic, photo-induced hydrophilic, or photo-induced hydrophobic properties due to the absorption of photons corresponding to the appropriate wavelength of the light incident on the self-cleaning layer 110. For example, the self-cleaning properties of some self-cleaning materials, such as titanium dioxide ($TiO_2$), may be enhanced or activated in response to light in the ultraviolet region of the electromagnetic spectrum, while other self-cleaning materials, such as nickel doped indium tantalate ($In_{(1-x)}Ni_xTaO_4$), may be responsive to light in the visible region of the electromagnetic spectrum. The activation or enhancement of the photocatalytic, photo-induced hydrophilic, or photo-induced hydrophobic self-cleaning properties of the self-cleaning layer 110 may also be referred to herein as a change of state of the self-cleaning layer 110. In some embodiments, the change of state may also include a switching from one of the self-cleaning properties to a different self-cleaning property. The exposure to, and resulting absorption of, the light may also cause the self-cleaning layer 110 to exhibit more than one of these properties. For example, the self-cleaning layer 110 may become both photocatalytic and hydrophilic, as will be understood in light of the present disclosure.

In some embodiments, the diffraction grating 105 may be a blazed diffraction grating having a blaze angle 20 arranged to enhance light absorption by the self-cleaning layer 110 and thus potentially enhance or activate the self-cleaning properties of the self-cleaning layer 110. The blaze angle 20 may be defined with respect an axis 22 substantially parallel to the surface 310 of the substrate 100.

The substrate 100 may be any base material for which self-cleaning properties are desired. Some examples of substrates include glass, ceramics, metals, composites, or other building materials. The self cleaning layer 110 may be any material exhibiting self-cleaning properties including but not limited to titanium dioxide (also know as $TiO_2$ and titania), nickel doped indium tantalate ($In_{(1-x)}Ni_xTaO_4$), or self-cleaning metals and metal-alloys. In some embodiments, the self-cleaning layer 110 may be a pre-formed film attached to the substrate. In some embodiments, the self-cleaning layer 100 may be disposed on or attached to the substrate 100 using conventional techniques, such as chemical vapor deposition (CVD), evaporation, and sputtering. Detailed discussion regarding attachment or deposition of the self-cleaning layer 110 is omitted here for convenience only and should not be considered limiting. In some embodiments, the self-cleaning layer 110 may be transparent with respect to the substrate 100, and may conform to any contours of the substrate 100, such that the self-cleaning layer 110 is largely indistinguishable with respect to the substrate. In addition, the substrate 100 may include a self-cleaning layer 110 on one or more surfaces of the substrate 100.

In the present disclosure, the self-cleaning material 10 may include the structure of the substrate 100 and the self-cleaning layer 110 in combination. While the substrate 100 alone may not necessarily exhibit self-cleaning properties, for convenience, the particular substrates 100 referred to herein as self-cleaning are understood to be in combination with a self-cleaning layer 110, such that the combined structure exhibits self-cleaning properties. For example, a glass substrate with a layer of $TiO_2$ may be referred to herein simply as self-cleaning glass. In some embodiments, the substrate 100 in the absence of the self-cleaning layer 110 may, under some conditions, exhibit self-cleaning properties (i.e., the substrate may itself be a self-cleaning material), with the diffraction grating 105 formed in the substrate 100 (using the techniques described below) to enhance or change the self-cleaning properties of the substrate 100.

Figure 2:
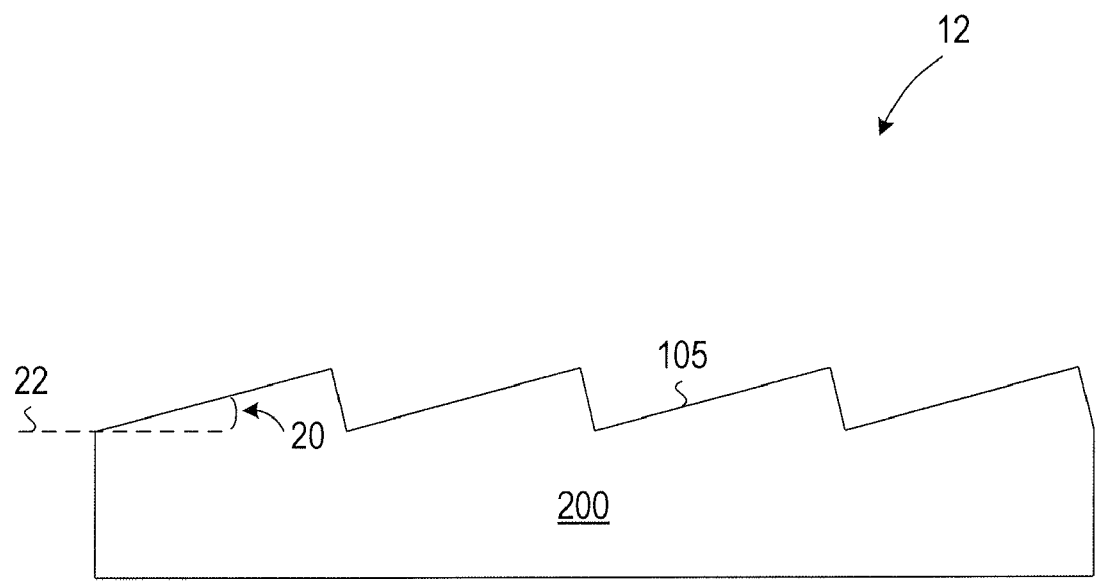
FIG. 2 is a cross-sectional view illustrating an example self-cleaning material.

FIG. 2 is a cross-sectional view illustrating an example self-cleaning material 12 arranged in accordance with at least some embodiments of the present disclosure where the substrate 200 may itself be a self-cleaning material and where the diffraction grating 105 may be formed directly in the substrate 200. Since the substrate 200 is itself a material with photo-induced self-cleaning properties, a separate self-cleaning layer (i.e., a material exhibiting self-cleaning properties) is not necessary, and the diffraction grating 105 may be formed directly in the surface of the substrate 200 in order to enhance the self-cleaning properties of the substrate 200.

In some embodiments of the present disclosure, the self-cleaning materials 10 may be used in a controlled or uncontrolled environment. A controlled environment may generally refer to a space where environmental parameters can be controlled and stabilized (e.g., indoors or an otherwise enclosed area), and may generally not be subject to exposure to weather or other volatile conditions. Environmental parameters include but are not limited to temperature, humidity, and illumination. In contrast, an uncontrolled environment generally refers to a space where the environmental parameters are not readily controlled (e.g., outdoors), and surfaces may be exposed to weather conditions. In some embodiments, one surface of the self-cleaning material 10 may be exposed to a controlled environment, and another surface of the self-cleaning material 10 may be exposed to an uncontrolled environment. One example may be a self-cleaning window (not shown), where one surface of the window may be an exterior surface and the other surface of the window may be an interior surface.

Incident light, or simply light, refers to the electromagnetic radiation in the visible, ultraviolet, and infrared regions of the electromagnetic spectrum impinging on a surface of the self-cleaning material 10. The exposure of a surface to light may also be referred to herein as illumination of the surface in question. Illumination characteristics for a surface include angle of incidence of the incident light, intensity of the incident light, wavelength distribution of the incident light, and the intensity distribution as a function of the wavelength.

The angle of incidence of the incident light may be measured from an axis perpendicular to (i.e., normal to) the surface of the self-cleaning material. An angle of incidence of zero (i.e., normal incidence) may refer to the illumination condition where the incident light impinges on the surface of the self-cleaning material 110 perpendicular to the surface. Glancing Incidence May Refer to Illumination of the Self-Cleaning Material where the angle of incidence approaches 90 degrees (i.e., nearly parallel to the surface of the self-cleaning material). Since the light impinging on the self-cleaning material may not be exactly collimated or collinear, the angle of incidence refers to the angle with the highest total intensity of light illuminating the surface. For example, illumination of a surface by direct sunlight will tend to have a higher total intensity than sunlight scattered onto the surface from other objects; thus, the angle of incidence is measured using the incident light from the sun.

In view of the present disclosure, it will be appreciated that illumination (also referred to as exposure) of the surface of the self-cleaning material 10 may be dependent on the environment. In an uncontrolled environment, such as outdoors, the illumination characteristics may be variable—dependent on time of day, season, proximate natural and man-made objects, and latitude—as the electromagnetic radiation from the sun reaching the surface of the earth is dependent on these variables. Conversely, in a controlled environment, such as an interior space with fixed lighting, the illumination characteristics may generally be dependent on the type and positioning of the lighting fixtures, with little variability except for switching on/off the lighting, using a dimmer, or changing the type or wattage of the light bulbs, etc.

Figure 3:
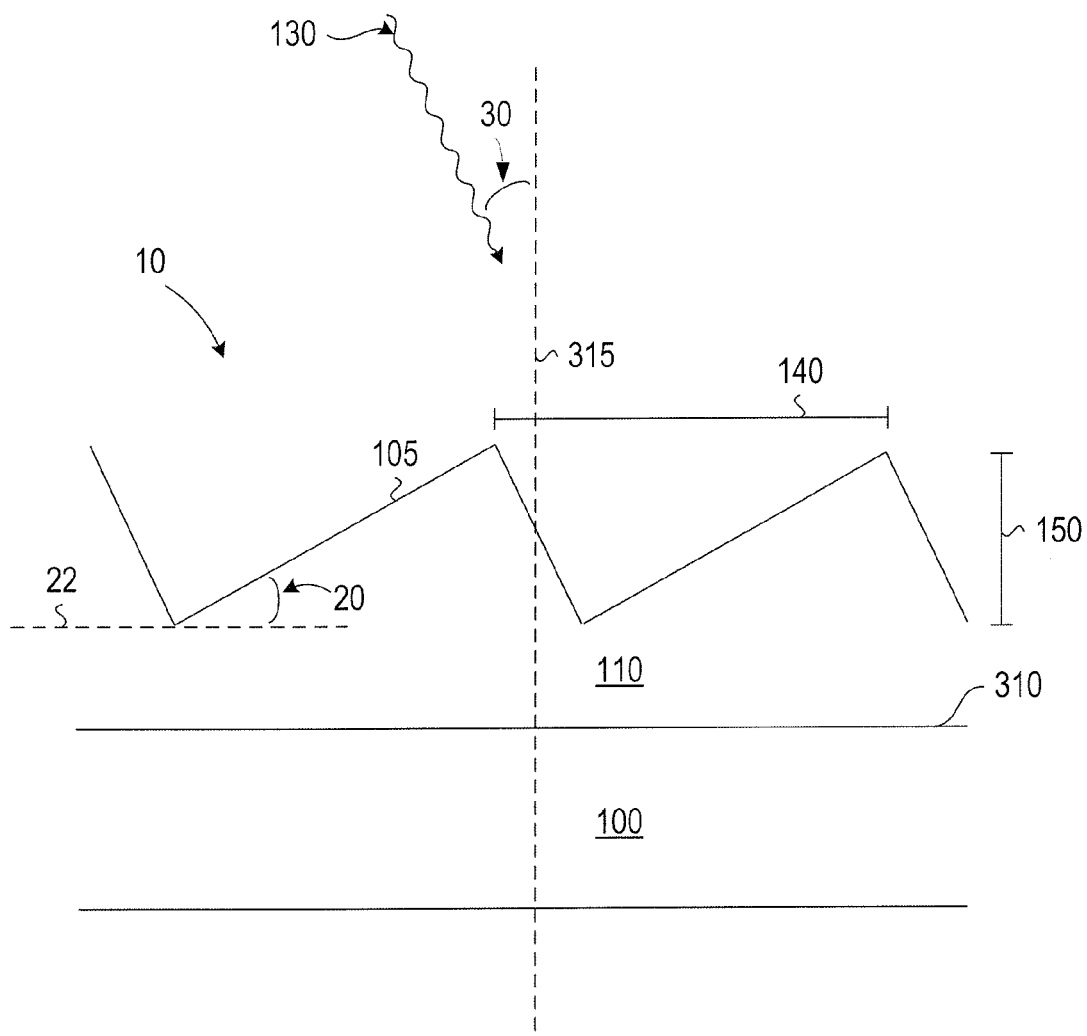
FIG. 3 is an enlarged cross-sectional view illustrating an example self-cleaning material showing an example of light incident thereon.

FIG. 3 is an enlarged cross-sectional view of a self-cleaning material 10 showing an example of light incident thereon, arranged in accordance with at least some embodiments of the present disclosure. The self-cleaning material 10 includes a substrate 100 and a self cleaning layer 110. Similar to the example of FIG. 1, the diffraction grating 105 is formed in the self-cleaning layer 110. Characteristics of the diffraction grating 105 may include one or more of the blaze angle 20, the grating pitch 140 (also referred to as grating period), and/or the amplitude 150. Light 130 incident on the self-cleaning material 10 having an angle of incidence 30 may be absorbed by the self cleaning layer 110 to activate the self-cleaning properties of the self-cleaning layer 110. The angle of incidence 30 of the incident light 130 may be measured with respect to an axis 315 perpendicular to (i.e., normal to) the surface 310 of the substrate 100 of the self-cleaning material 10. In some embodiments, the self-cleaning properties of the self-cleaning layer 110 may be enhanced as the angle of incidence 30 approaches the blaze angle 20, since the wavelength of the incident light 130 initiating the self-cleaning properties may be more efficiently coupled by the diffraction grating 105 into the self-cleaning layer 110 than other wavelengths. For example, the blaze angle 20 may be selected so that wavelengths in the ultraviolet (UV) region of the electromagnetic spectrum are more efficiently absorbed by the self-cleaning layer 110 than wavelengths of visible light. In some embodiments, the blaze condition of the diffraction grating is arranged to improve the chance of a two-photon absorption by the self cleaning layer, such that the two photon absorption by the self cleaning layer is arranged to enter a photo catalytic state based on visible wavelengths of light. In some embodiments, if the angle of incidence 30 is not matched to the blaze angle 20, the absorption of the incident light 130 by the self-cleaning layer 110 may be insufficient to activate the photo-induced self-cleaning properties of the self-cleaning layer 110.

Figure 4:
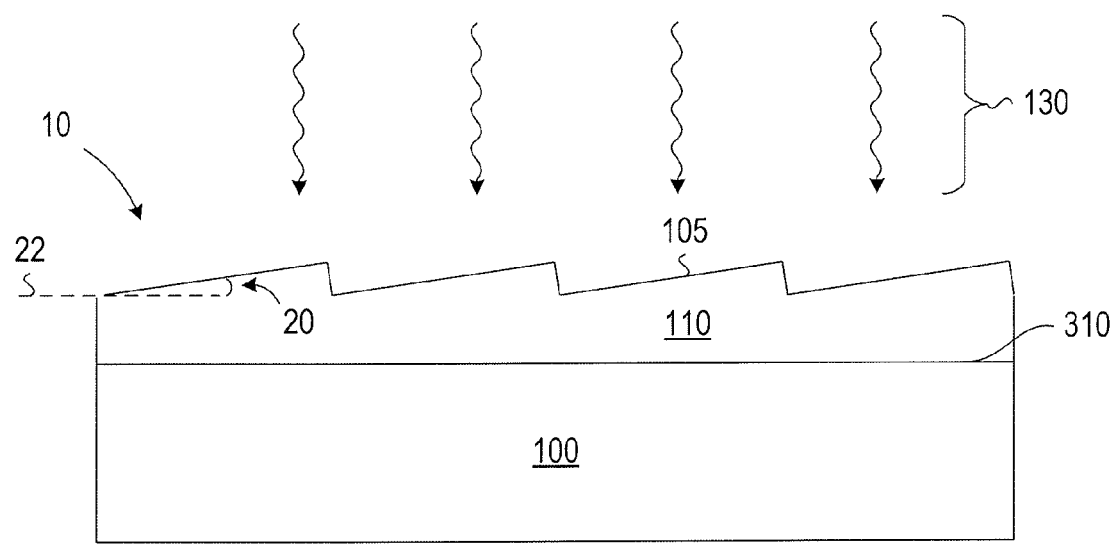
FIG. 4 is a cross-sectional view illustrating an example self-cleaning material with a blaze angle for nearly normal incident exposure.

FIG. 4 is a cross-sectional view illustrating an example self-cleaning material 10 having a blaze angle 20 for nearly normal incident exposure of light 130, arranged in accordance with at least some embodiments of the present disclosure. The blaze angle 20, described above, corresponds to the diffraction grating 105 of the self-cleaning layer 110. For an illumination condition where the incident light 130 may be perpendicular (i.e., normal incidence) or nearly perpendicular to the surface 310 of the substrate 110 (i.e., low angle of incidence), the self-cleaning properties of the self-cleaning layer 110 may be enhanced for low values of the blaze angle 30, where the incident light 130 may be nearly perpendicular to the surface of the diffraction grating 105 forming the blaze angle 20. For example, a self-cleaning ceramic tile may be used in a substantially horizontal orientation, such as on a floor or other horizontal surface. For light sources such as the sun outdoors or ceiling lighting fixtures indoors, the angle of incidence of the light illuminating the surface of the tile is nearly normal to the surface. Thus a self-cleaning material 10 with a small blaze angle 20 may provide efficient self-cleaning properties.

Figure 5:
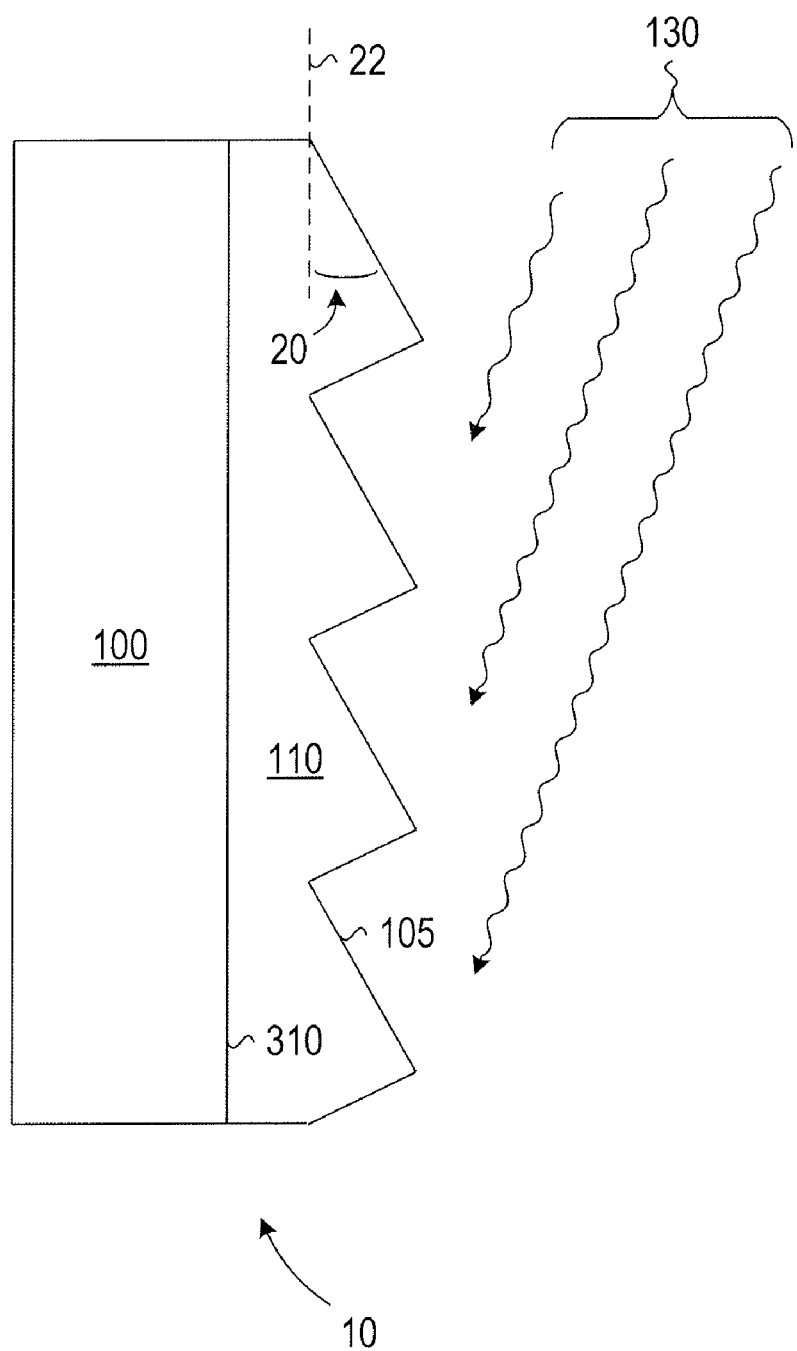
FIG. 5 is a cross-sectional view illustrating an example self-cleaning material with a blaze angle for glancing incident exposure.

FIG. 5 is a cross-sectional view illustrating an example self-cleaning material having a blaze angle 20 for glancing incident exposure of the light 130, arranged in accordance with at least some embodiments of the present disclosure. The blaze angle 20, described above, corresponds to the diffraction grating 105 of the self-cleaning layer 110. For an illumination condition where the incident light 130 may be substantially parallel to the surface 310 of the substrate 100 (i.e., glancing incidence or high angle of incidence), the self-cleaning properties of the self-cleaning layer 110 may be enhanced for higher values of the blaze angle 20, where the incident light 130 may be nearly perpendicular to the surfaces of the diffraction grating 105 forming the blaze angle 20. For example, for a self-cleaning ceramic tile used in a vertical orientation such as mounted on a wall under the same illumination conditions as previously described with respect to the example of FIG. 4, the angle of the incidence 20 of the light illuminating the surface may be high, even approaching glancing incidence. A self-cleaning material 10 with a large blaze angle 30 may provide efficient self-cleaning properties for the self-cleaning ceramic tile in the vertical orientation.

Figure 7:
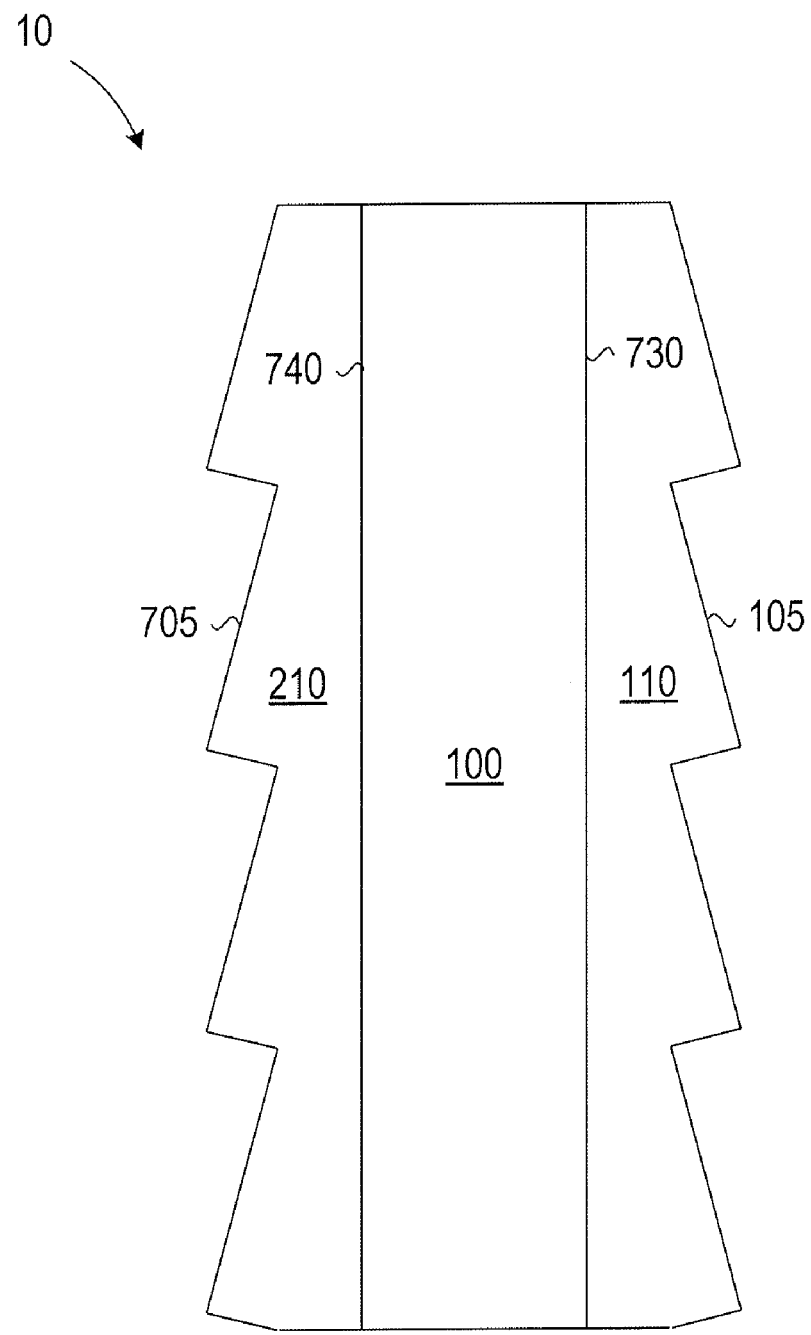
FIG. 7 is a cross-sectional view illustrating an example self-cleaning material where multiple surfaces of the substrate include a self-cleaning layer.

FIG. 7 is a cross-sectional view illustrating an example self-cleaning material 10 where multiple surfaces 730, 740 of the substrate 100 include a self-cleaning layer 110, 210, arranged in accordance with at least some embodiments of the present disclosure. Self-cleaning layer 110 may be formed on a first surface 730 of the substrate 100 and includes a first diffraction grating 105. Self-cleaning layer 210 may be formed on a second surface 740 of the substrate 100 and includes a second diffraction grating 705. The depiction of the surfaces 730, 740 as parallel or on opposite sides of the substrate 100 in FIG. 7 should not be considered limiting. For example, for a cubic substrate, two adjacent surfaces of the cube may have a self-cleaning layer (e.g., a block of building material on the corner has two adjacent exterior sides). Likewise, some embodiments may include a self-cleaning material 10 where more than two surfaces of the substrate may have a self-cleaning layer.

Still referring to FIG. 7, the self-cleaning layers 110, 210 may be the same material, or alternately the self-cleaning layer 110 may be a different material than the self-cleaning layer 210. In some embodiments, the self-cleaning layers 110, 210 may be selected based on the type of environment or the self-cleaning properties desired for each surface 730, 740 of the self-cleaning material 10. For example, one surface of the self-cleaning material 10 may be exposed to a controlled environment, while another surface of the self-cleaning material may be exposed to an uncontrolled environment. In the controlled environment, photocatalytic properties may be used to disinfect the surfaces of the controlled environment may be important, while in the uncontrolled environment, hydrophilic properties may be more important to keep the surface from soiling.

Figure 8:
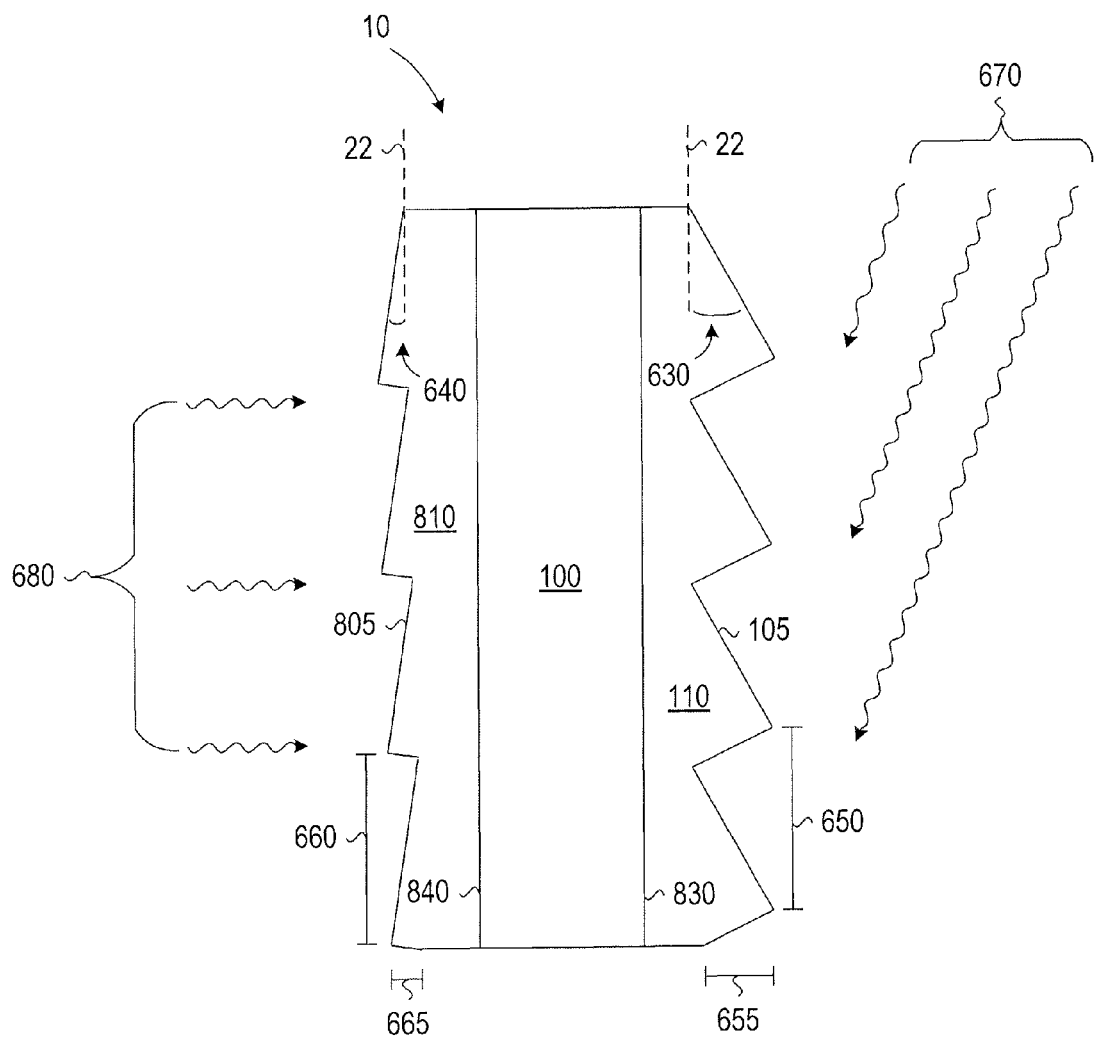
FIG. 8 is a cross-sectional view illustrating an example self-cleaning material where multiple surfaces of the substrate include a self-cleaning layer with different blaze angles; all arranged in accordance with the at least some embodiments of the present disclosure.

FIG. 8 is a cross-sectional view illustrating a self-cleaning material 10 where multiple surfaces 830, 840 of the substrate 100 include a self-cleaning layer 110, 810 with diffraction gratings 105, 805 having blaze angles 630, 640, arranged in accordance with at least some embodiments of the present disclosure. Self-cleaning layer 110 may be formed on a first surface 830 of the substrate 100 and may include a diffraction grating 105 with a first blaze angle 630, first pitch 650, and first amplitude 655. Self-cleaning layer 810 may be formed on a second surface 840 of the substrate 100 and may include a diffraction grating 805 with second blaze angle 640, second pitch 660, and second amplitude 665. As discussed above with respect to FIG. 7, the depiction of the surfaces 830, 840 as parallel to or on opposite sides of the substrate 100 in FIG. 8 should not be considered limiting. Likewise, some embodiments may include a self-cleaning material 10 where more than two surfaces of the substrate may have a self-cleaning layer.

Still referring to FIG. 8, the self-cleaning layers 110, 810 may be the same material, or alternately the self-cleaning layer 110 may be a different material than the self-cleaning layer 810. The blaze angles 630, 640, as well as other characteristics, such as the pitches 650, 660, and the amplitudes 655, 665 of the diffraction gratings 105, 805 may be selected based on the expected or most probable illumination conditions of their respective surfaces. Thus, in the embodiment of FIG. 8, for example, the blaze angle 630 for the first self-cleaning layer 110 may be noticeably larger than the blaze angle 640 for the second self-cleaning layer 810. Similarly, amplitude 655 for the first diffraction grating 105 may be different than the amplitude 665 for the second diffraction grating 805. In FIG. 8, the second surface 840 of the self-cleaning material 10 may most typically be illuminated with light 680 of normal incidence; thus a low blaze angle 640 is used. In contrast, for the second surface 830 of the self-cleaning material 10, an illumination 670 may be glancing incidence, and a high blaze angle 630 may be used. For example, for a self-cleaning material may be used in a vertical orientation (e.g., self-cleaning glass used in a window), the direct illumination of the exterior surface of the window by sunlight may be considered as glancing illumination (a very high angle of incidence), while the illumination of the interior side of the window by interior light fixtures may have much lower angles of incidence.

Figure 6:
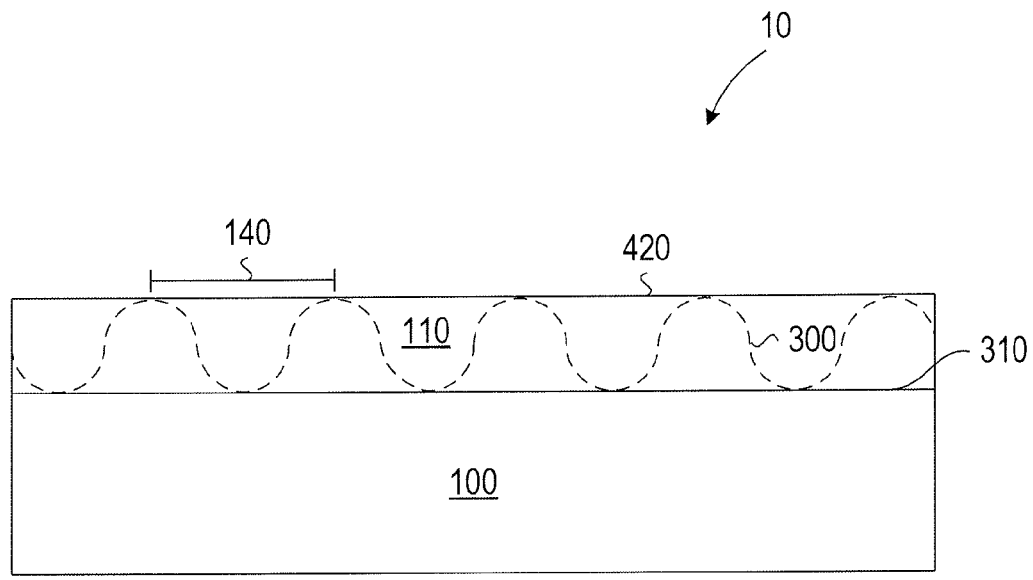
FIG. 6 is a cross-sectional view illustrating an example self-cleaning material utilizing a phase grating.

FIG. 6 is a cross-sectional view illustrating a self-cleaning material 10 utilizing a phase grating, arranged in accordance with at least some embodiments of the present disclosure. The self-cleaning material 10 may include a substrate 100 and a self cleaning layer 110. In some embodiments, a phase grating 300 may be formed within the self-cleaning layer 110, such that the surface 420 of the self-cleaning layer 110 may be substantially planar (if the substrate is substantially planar) or may generally conform to the surface 310 of the substrate 100 (if the substrate is not planar). Characteristics of the phase grating 300 such as the grating pitch 140 may be selected to more efficiently couple the light incident on the surface of the self-cleaning material 10, and may be arranged to enhance the self-cleaning properties of the self-cleaning layer 110.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A self-cleaning material that is responsive to exposure to light comprising:
   a substrate having a first surface and a second surface;
   a self cleaning layer disposed on the first surface of the substrate; and
   a diffraction grating formed in an exposed surface of the self cleaning layer, wherein the diffraction grating includes a blaze condition that is arranged to enhance absorption of light incident on the exposed surface.

2. The self-cleaning material of claim 1, wherein the blaze condition of the diffraction grating corresponds to a most probable angle of incidence of the light related to an intended usage orientation of the self-cleaning material.

3. The self-cleaning material of claim 2, wherein the intended usage orientation is substantially vertical and the most probable angle of incidence of the light is nearly parallel to the first surface.

4. The self-cleaning material of claim 2, wherein the intended usage orientation is substantially horizontal and the most probable angle of incidence of the light is nearly perpendicular to the first surface.

5. The self-cleaning material of claim 1, wherein the diffraction grating is a phase grating.

6. The self-cleaning material of claim 1, wherein the self cleaning layer is either photocatalytic, hydrophobic, or hydrophilic in response to exposure to light.

7. The self-cleaning material of claim 6, wherein the light is ultraviolet light.

8. The self-cleaning material of claim 1, wherein the self cleaning layer at least partially comprises titanium dioxide.

9. The self-cleaning material of claim 1, wherein the blaze condition of the diffraction grating is arranged such that the self cleaning layer exhibits a photocatalytic property when illuminated using visible wavelengths of light via a two-photon absorption process.

10. A self-cleaning material that is responsive to exposure to light comprising:
    a substrate having a first surface and a second surface;
    a first self cleaning layer disposed on the first surface of the substrate, wherein a first diffraction grating having a first blaze condition is formed on a first exposed surface of the first self cleaning layer and arranged to enhance the absorption of light based at least in part on the first blaze condition; and
    a second self cleaning layer disposed on the second surface of the substrate, wherein a second diffraction grating having a second blaze condition is formed on a second exposed surface of the second self cleaning layer and arranged to enhance the absorption of light based at least in part on the second blaze condition.

11. The self-cleaning material of claim 10, wherein the first and second self cleaning layers are different materials.

12. The self-cleaning material of claim 10, wherein the absorption of light by the first self cleaning layer and the second self cleaning layer causes the respective self cleaning layer to exhibit one of a photocatalytic property, a hydrophobic property, or a hydrophilic property.

13. The self-cleaning material of claim 12, wherein the second self cleaning layer exhibits a different self cleaning property than the first self cleaning layer.

14. The self-cleaning material of claim 10, wherein the first and second blaze conditions correspond to most probable angles of incidence of the light on the first and second exposed surfaces of the first and second self-cleaning layers, respectively.

15. The self-cleaning material of claim 10, wherein the first blaze condition is selected based on the first self cleaning layer being utilized in an uncontrolled environment and the second blaze condition is selected based on the second self cleaning layer being utilized in a controlled environment.

16. A self-cleaning material comprising:
a first blazed diffraction grating formed in a first surface of the self-cleaning material, wherein absorption of light by the self-cleaning material incident on the first surface is arranged to enter a first photo-induced self cleaning state on the first surface based on a first blaze condition corresponding to the first blazed diffraction grating and a first incident angle of the light with the first surface; and
a second blazed diffraction grating formed in a second surface of the self-cleaning material, wherein absorption of light by the self-cleaning material incident on the second surface is arranged to enter a second photo-induced self cleaning state on the second surface based on a second blaze condition corresponding to the second blazed diffraction grating and a second incident angle of the light with the second surface.

17. The self-cleaning material of claim 16, wherein the first or second blaze condition of the respective blazed diffraction grating corresponds to a most probable angle of incidence of the light related to an intended usage orientation of the self-cleaning material.

18. The self-cleaning material of claim 16, wherein the self cleaning material is either photocatalytic, hydrophobic, or hydrophilic in response to exposure to light.

* * * * *

UNITED STATES PATENT AND TRADEMARK OFFICE
CERTIFICATE OF CORRECTION

PATENT NO. : 8,075,980 B2  
APPLICATION NO. : 12/465711  
DATED : December 13, 2011  
INVENTOR(S) : Eldering et al.

It is certified that error appears in the above-identified patent and that said Letters Patent is hereby corrected as shown below:

On Page 2, in Field (56), under "OTHER PUBLICATIONS", in Column 1, Line 8, delete "TiO2" and insert -- $TiO_2$ --, therefor.

In Column 2, Line 67, delete "know" and insert -- known --, therefor.

In Column 4, Lines 11-12, delete "Incidence May Refer to Illumination of the Self-Cleaning Material" and insert -- incidence may refer to illumination of the self-cleaning material --, therefor.

Signed and Sealed this
Fifth Day of June, 2012

David J. Kappos
*Director of the United States Patent and Trademark Office*